INVENTOR.
HAROLD ENGLAND
BY Samuel Lindenberg
Arthur Freilich
ATTORNEYS 3,260,364
ARTICLE HANDLING AND SIZING APPARATUS
Harold England, Los Angeles, Calif., assignor to Ampex Corporation, Culver City, Calif., a corporation of California
Filed Dec. 12, 1963, Ser. No. 330,137
8 Claims. (Cl. 209—107)

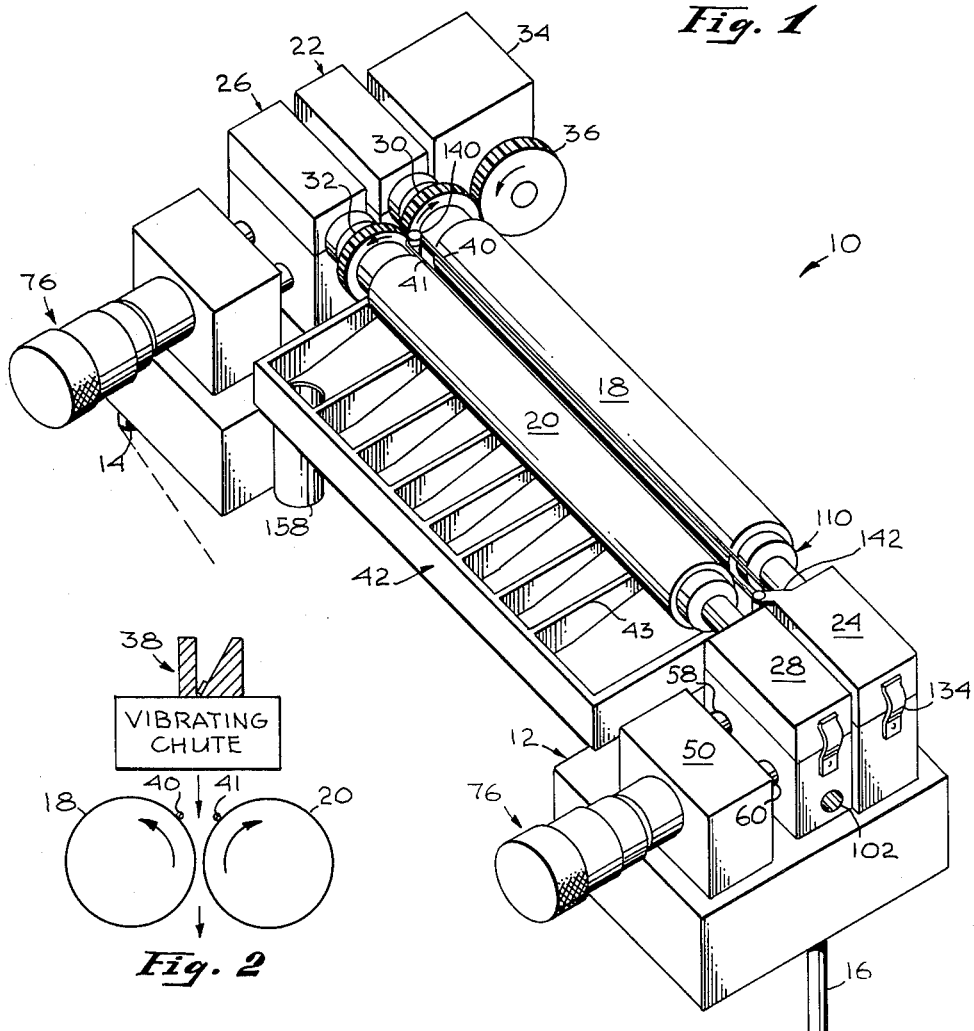
Fig. 1
Fig. 2
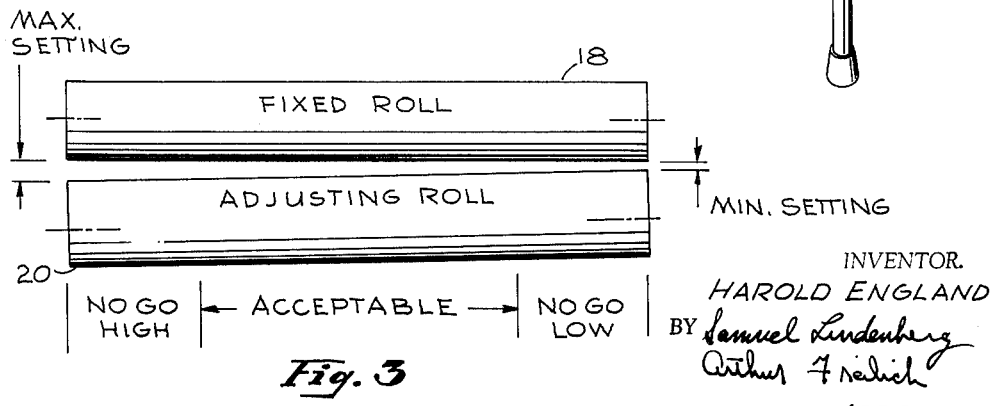
Fig. 3
INVENTOR.
HAROLD ENGLAND
BY Samuel Lindenberg
Arthur Fredrich
ATTORNEYS

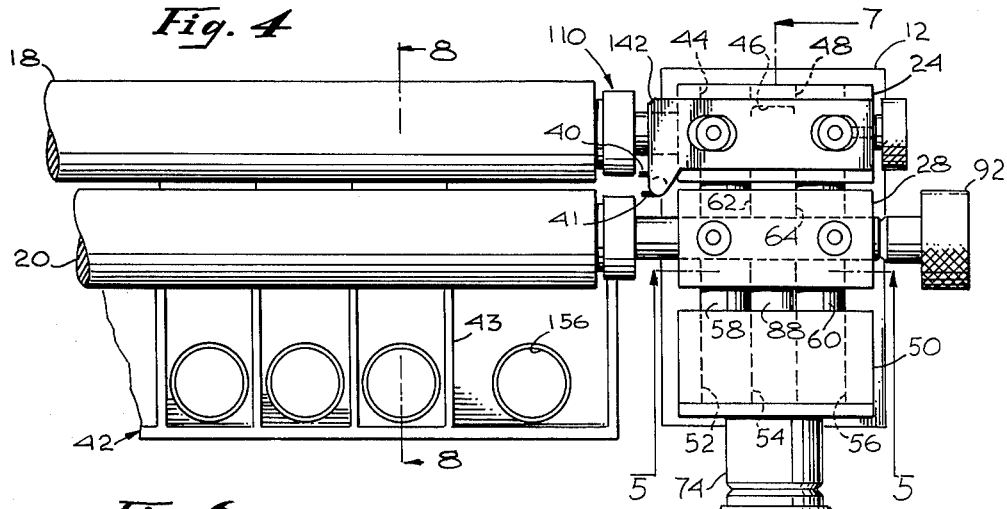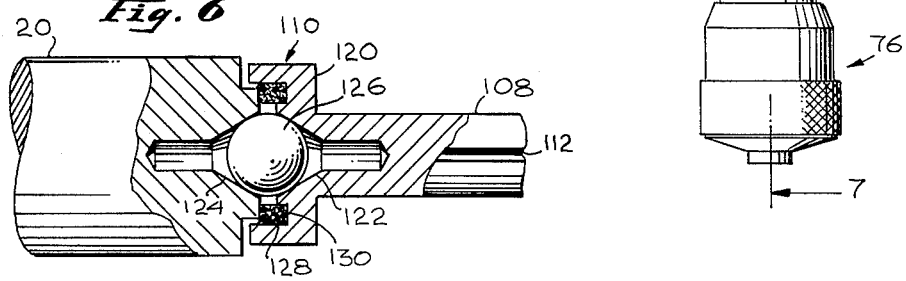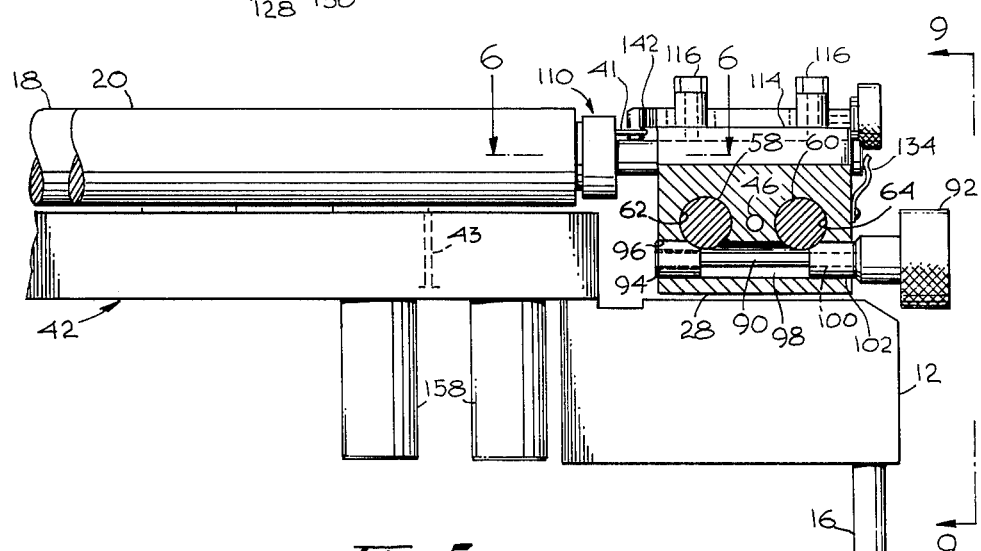

This invention relates generally to article handling and sizing apparatus and more particularly to apparatus for separating extremely small articles, e.g. magnetic cores, into different size categories.

Great strides have been made in recent years in reducing the size of components used in modern electronic equipment. Although component miniaturization has eliminated many problems with respect to packaging, transporting, etc., new problems, e.g. that of handling small discrete components, has arisen.

To be more specific, consider the problems encountered in attempting to separate cores, nominally .010 inch thick into categories identified as unacceptable oversized, acceptable, and unacceptable undersized where the tolerance is ±.0003 inch. If speed and cost were not extremely significant considerations, manual techniques for separating the cores could be used. However, inasmuch as it is desired to handle several hundred cores per hour, the use of manual techniques is inappropriate. Although many attempts have been made to mechanize the sizing procedure, such attempts have resulted in apparatus which invariably has been less than fully satisfactory due either to accuracy limitations, reliability considerations, etc.

Consequently, it is an object of the present invention to provide improved article handling apparatus capable of rapidly and accurately sorting articles into different size categories.

It is a more particular object of this invention to provide apparatus for rapidly and accurately sizing a wide range of magnetic cores, which apparatus is extremely reliable and relatively inexpensive.

In accordance with the invention a pair of aligned cylindrical rollers are provided whose axes can be selectively positioned either parallel to or at a slight angle with respect to one another. Means are provided for moving the axis of at least one of said rollers with respect to the other for establishing a selected spacing between the rollers. The rollers are continuously driven in opposite directions with their surfaces adjacent to the spacing defined therebetween, moving away from one another above the common plane containing the roller axes. With the roller axes diverging at a slight angle from one another from the first ends thereof, and with said first roller ends being retained at a higher level than the opposite roller ends, articles, e.g. magnetic cores, dropped into the space between the rollers will fall, dependent on their size, into a particular one of a plurality of compartments of a tray mounted beneath the rollers.

Certain significant structural features of the disclosed preferred embodiment of the invention assure accurate and reliable operation. Initially, by causing the roller surfaces to move away from one another between the rollers and above the common plane containing the roller axes, crushing of articles between the rollers is avoided. Core crushing, characteristic of some types of prior art sizing apparatus, develops a dust which often disturbs apparatus used in the subsequent handling of the cores in, for example, the manufacture of core planes. In order to further prevent core crushing, wiper means are positioned adjacent the surface of each roller to prevent cores from adhering to the roller surface and being crushed when entering the space between the rollers from beneath.

Secondly, the rollers are mounted so as to rotate freely on sealed bearings which permit angular movement of at least one of the rollers with respect to the other under the control of a micrometer type adjusting means. In addition, the rollers are resiliently mounted so as to prevent temperature induced expansion effects from tending to inhibit the roller rotation. A locking means is provided for selectively locking in position the roller capable of being moved.

Thirdly, the tray supported between the rollers is provided with a plurality of compartments which are separated by knife edges so as to assure that all cores falling through the space between the rollers, seeks a definite compartment.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a perspective view of a preferred embodiment of article handling and sizing apparatus in accordance with the present invention;

FIGURE 2 is a diagrammatic vertical sectional view illustrating the manner in which magnetic cores can be introduced into the sizing apparatus;

FIGURE 3 is a diagrammatic plan view of the preferred embodiment of the apparatus illustrating a typical relative orientation of the rollers;

FIGURE 4 is a plan view partially illustrating the structural means permitting the movement of one of the rollers with respect to the other;

FIGURE 5 is a vertical sectional view taken substantially along the plane 5—5 of FIGURE 4 illustrating in detail the locking means provided for enabling the movable roller to be locked in a selected position;

FIGURE 6 is a horizontal sectional view taken substantially along the plane 6—6 of FIGURE 5 illustrating the swivel bearing means coupling a roller and spindle;

Figure 7:
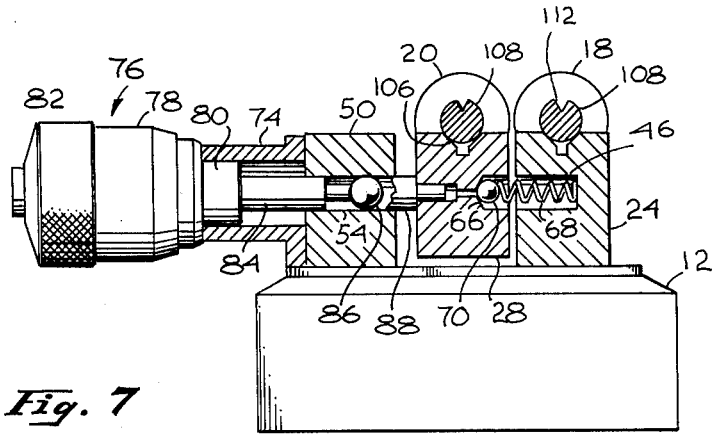
FIGURE 7 is a vertical sectional view taken substantially along the plane 7—7 of FIGURE 4 illustrating the means for manually positioning the movable roller.

Attention is now called to FIGURE 1 of the drawings illustrating a preferred embodiment of the article and sizing apparatus 10 in accordance with the present invention. The apparatus includes a base plate 12 supported on a pair of legs 14 spaced from a third leg 16. The leg 16 is preferably formed of telescoping sections so that it can be made longer than legs 14 thereby permitting the base plate 12 to be retained at an acute angle with respect to a horizontal plane supporting the legs.

Supported on the base plate 12 are a pair of cylindrical rollers 18 and 20. The roller 18 is supported for rotational movement between a pair of blocks 22 and 24 which are secured to the base plate 12. The roller 20 is supported between a pair of blocks 26 and 28 each of which is supported by means which permit it to independently move in a plane parallel to the base plate 12, as will be more specifically described hereinafter. The means permitting movement of the blocks 26 and 28 in turn allow the dimensions of the space defined between the rollers 18 and 20 to be accurately established. Moreover, inasmuch as the blocks 26 and 28 can be moved independently, the axis of roller 20 can be positioned either parallel or diverging from the axis of roller 18. Where the apparatus 10 is utilized to size the articles for developing categories of unacceptable undersized, acceptable, and unacceptable oversized, the rollers 18 and 20 are positioned so that their axes diverge. It is pointed out that although the rollers 18 and 20 can be positioned so that their axes diverge, the axes are at all times restricted to a common plane extending parallel to the base plate 12.

A pair of coupled gears 30 and 32 are respectively secured to the rollers 18 and 20. A drive motor 34 is provided with a gear 36 engaged with gear 30 on roller 18. By causing gear 36 to rotate counterclockwise, as shown in FIGURE 1, roller 18 will be caused to rotate clockwise and roller 32 to rotate counterclockwise. Thus, it should be apparent that the surfaces of the rollers 18 and 20 will be moving upwardly and away from each other in the region between the rollers immediately above the common plane containing the roller axes.

As shown in FIGURE 2, the articles, hereinafter assumed to be magnetic cores, to be sized are dropped one at a time from a vibrating chute mechanism 38 into the region between the rollers 18 and 20 proximate the blocks 24 and 28. Inasmuch as the rollers are inclined, the cores dropped therebetween will tend to move toward the geared end of the rollers. If the rollers are positioned with their axes diverging (FIGURE 3) from blocks 24 and 28, each core, in traveling the length of the rollers from proximate blocks 24 and 28 to proximate blocks 22 and 26, will fall through the space provided between the rollers when the space exceeds its thickness.

It is to be noted in FIGURES 1 and 2 that inasmuch as the rollers 18 and 20 rotate in the directions indicated, i.e. upwardly in the region between the rollers, the cores cannot be pushed down between the rollers and crushed. Although rollers formed of any material can be utilized in accordance with the invention so long as they can be machined very precisely, it has been found that chrome-plated rollers are very satisfactory. It should be apparent that it is very essential in order for the apparatus to accurately size the cores, that the roller surfaces define extremely straight lines along the length thereof inasmuch as the space defined between the roller surfaces must provide a nearly perfect taper for accurate operation. Chrome-plated rollers approximately two feet long have been provided for the illustrated apparatus whose surfaces have straight line tolerances on the order of .000015 inch. By utilizing chrome-plated rollers, there should be practically no adhesion, either magnetic or otherwise, between the magnetic cores and the roller surfaces. However, because of the extremely low mass of the cores and certain stray effects, cores sometimes adhere to the roller surfaces and although not crushed by the rollers immediately above the common plane containing the roller axes, are sometimes carried around by the roller surfaces and are crushed when brought into the region between the rollers from beneath. In order to prevent cores from being crushed, wiper means in the form of first and second tape lengths 40 and 41 are respectively provided for engaging the roller surfaces along the full length thereof.

Positioned beneath the space defined between the rollers 18 and 20 is a tray 42 which includes a plurality of compartments separated by vertical walls 43. In the operation of the apparatus of FIGURE 1, the cores dropped between the rollers 18 and 20 will fall through the space therebetween into a particular tray compartment depending upon the size of the core and the spacing defined between the rollers. A receptacle is provided in each compartment for collecting all the cores falling therein.

Figure 8:
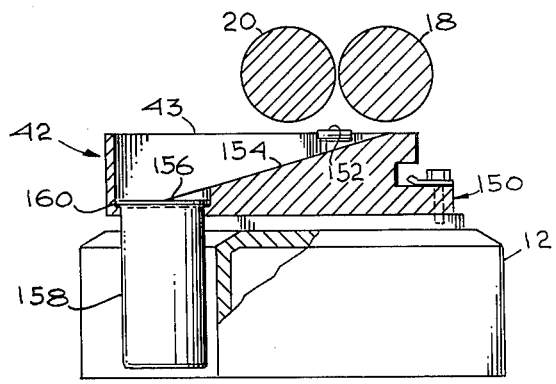
FIGURE 8 is a vertical sectional view taken substantially along the plane 8—8 of FIGURE 4 illustrating the detail of a portion of a tray utilized to handle the sized cores.
Figure 9:
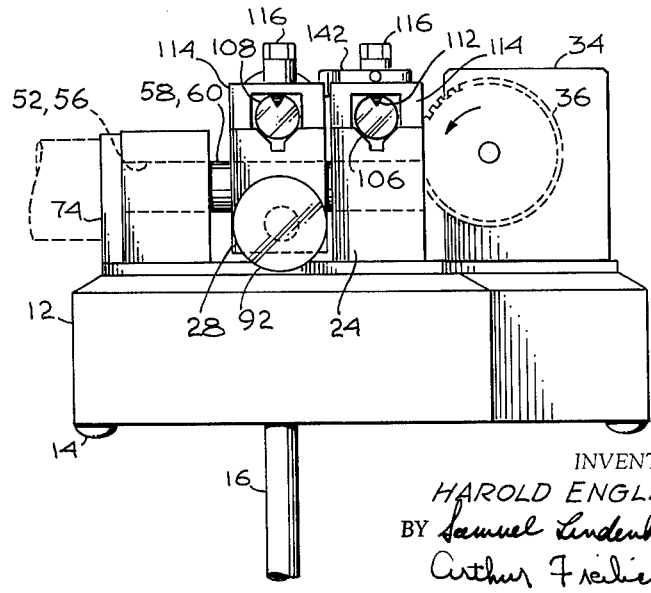
FIGURE 9 is a vertical sectional view taken substantially along the plane 9—9 of FIGURE 5 illustrating the means for retaining the roller supporting spindles.

The foregoing description directed to FIGURES 1 through 3 has been concerned with the general structural and operational features of the invention. Attention is now called to FIGURES 4 through 9, which in conjunction with FIGURES 1 through 3 illustrate the details of the preferred embodiment of the apparatus.

The block 24 is secured to the base plate 12 and is provided with three apertures 44, 46, and 48 extending partially therethrough. Another block 50 is also secured to the base plate 12 and likewise is provided with three apertures 52, 54, and 56 which are respectively aligned with the apertures defined in block 24. A first rod 58 extends between and is secured in aperture 44 of block 24 and aperture 52 of block 50. A second rod 60 extending parallel to rod 58 similarly extends between and is secured in apertures 48 and 56.

Block 28 is provided with apertures 62 and 64 which extend therethrough and are respectively in alignment with apertures 44 and 48 of block 24. Rods 58 and 60 respectively extend through apertures 62 and 64 so that block 28 can slide on rods 58 and 60. Block 28 is further provided with a recess 66 in alignment with aperture 46 in block 24. A spring 68 is retained in aperture 46 and extends into recess 66 in block 28 bearing against a ball 70 engaged against the terminal portion of recess 66. Thus, spring 68 acts to slide block 28 on rods 58 and 60 away from block 24.

Secured to block 50 is a cylindrical washer 74 defining a central aperture in alignment with aperture 54 in block 50. A micrometer apparatus 76 is provided and includes a substantially cylindrical body 78 having a reduced portion 80 fixed in the central aperture provided in the cylindrical washer 74. The micrometer assembly 76 further includes a knurled rotatable knob 82 coupled to a central shaft 84. By respectively rotating the knob clockwise and counterclockwise, the shaft 84 will be projected and withdrawn rearwardly. The shaft 84 is aligned with the aperture 54 in block 50 and bears against a ball 86 contained therein. The ball 86 in turn is engaged in a seat defined in the end of a push rod 88 which extends out of the aperture 54 in block 50. The rod 88 has a reduced portion 89 projecting into the block 28 and a shoulder which bears thereagainst. Thus, in response to rotation of the knurled head 78, the micrometer assembly shaft 84 can be projected a precise distance to in turn force the push rod 88 against the block 28 to oppose the spring 68 and position the block 28 at any point on the rods 58 and 60.

In order to lock the block 28 in position on the rods 58 and 60, a locking mechanism, including a shaft 90 secured to a knurled head 92 projecting into block 28 is provided. The shaft 90 is terminally threaded in an internally threaded aperture in a wedge block 94 slidably contained in a recess 96 in the block 28. A second wedge block 100 is slidably retined in recess 102 in block 28. By rotating the knurled head 92 to in turn rotate the shaft 90, the wedge block 94 can be drawn toward the head 92 to engage rod 58. By drawing wedge block 94 into engagement with rod 58, wedge block 100 is in turn drawn into engagement with rod 60. Thus, with wedge blocks 94 and 100 respectively tightly engaging rods 58 and 60, block 28 is prevented from slidably moving on rods 58 and 60.

The apparatus thus far discussed with respect to the blocks 24 and 28 positioned adjacent a second end of the base plate 12 is duplicated with respect to blocks 22 and 26 positioned adjacent the first end of the base plate 12. Thus, it should be appreciated that either of the blocks 26 or 28 can be locked in position a selected and precise distance from the corresponding stationary blocks 22 and 24.

Defined in the top of each of blocks 22, 24, 26, and 28 is a V-shaped channel 106. Received in each of the channels 106 is the reduced end 108 of a different spindle 110. A channel 112 is defined in each of the reduced spindle ends 108. Supported on the top surface of each of the blocks 22, 24, 26, and 28 is a frame 114 supporting a screw having a spring mounted shaft projecting into the channel 112 of the corresponding spindle 110. Thus, the spindle 110 supported by each of the blocks 22, 24, 26, and 28 is permitted to slidably move in the block channels 106. The V-shape of the channels precisely centers each spindle with respect to the blocks. Moreover each spindle is prevented from rotating by the engagement of the shaft of screw 116 in the channel 112.

Each of the spindles 110 is provided with an enlarged end 120 defining a ball bearing seat therein. A similar ball bearing seat 124 is defined on the opposite end of each of the rollers 18 and 20. Thus, the roller 18 is positioned between the spindles respectively supported by blocks 22 and 24 and the roller 20 is similarly supported between the spindles mounted on blocks 26 and 28. Received between the opposed ball bearing seats in the ends of the rollers and the ends of the spindles are ball bearings 126. A sealing washer 128 is retained in a channel 130 defined around the ball bearing seats 122 in each of the enlarged spindle ends 120. A reduced portion on each of the roller ends bears against the sealing washer 130 as shown in FIGURE 6. Flat springs 134 are retained on the end walls of each of the blocks 22, 24, 26, and 28 and bear against the free ends of the reduced portions of the spindles 110 to thereby seal the ball bearing 126 and provide firm support for the rollers 18 and 20.

From the discussion of FIGURE 6, it should be apparent that the rollers 18 and 20 are not only able to rotate on the ball bearings with respect to the retained spindles 110, but in addition the axis of the roller 20 is able to swivel with respect to the axis of the spindles so that the roller 20 can be positioned such that its axis diverges from the axis of roller 18 thereby permitting the rollers to be oriented as shown in FIGURE 3, i.e. with the space between the rollers being tapered to permit cores of one size to fall through between the rollers toward one end thereof and to prevent those same cores from falling through the rollers toward the other end thereof.

It has already been mentioned that wiper means, for example in the form of tape lengths of a material such as nylon, are provided in order to prevent cores from adhering to the surface of the rotating rollers. The nylon tape lengths 40 and 41 are supported in engagement with the roller surfaces and made taut by securing them at a first end to a post 140 and at a second end to a plate 142 which can be incrementally moved further from the post 140 by adjusting screw 146.

The compartmented tray 42 is removably supported on the base plate 12 beneath the rollers 18 and 20. A guide boss 150 is secured to the base plate 12 and adapted to engage the rear surface of the removable tray 44 in order to assure the proper positioning of the tray relative to the rollers 18 and 20. The tray includes a plurality of compartments defined between vertically extending walls 43. A portion of the upper surface of each of the walls 43 terminates in a knife edge 152, the knife edge being positioned beneath the space defined between the rollers 18 and 20. By providing the knife edge, cores falling through the space defined between the rollers necessarily seek a particular one of the tray compartments and are thus unable to collect between compartments as would occur if the top surfaces of walls 43 were flat. Each of the compartments in tray 42 includes an inclined ramp 154 which has a high end adjacent to the rollers and a lower end spaced from the rollers. A hole 156 is defined in the lower end of each compartment ramp 154 and a receptacle, such as the clear plastic jar 158 is received therein. The jars 158 are provided with upper flanges 160 which engage the ramp around the hole 156 and thus dependingly support the jar 158.

From the foregoing, it should be appreciated that an apparatus has been disclosed herein which is capable of continuously and very accurately and reliably handling and sizing very small articles such as magnetic cores. The structural characteristics, i.e. of providing a pair of stationary blocks 22 and 24, and a pair of movable blocks 26 and 28 which can be precisely moved by the use of micrometer type adjusting means at each end of the roller 20 permits the dimensions of the space between the rollers to be precisely defined. By inclining the entire base plate 12, and by continually rotating the rollers, continual operation of the apparatus is made possible. Rotation of the rollers in the direction illustrated, together with the provision of the wiper means, prevents the crushing of any of the cores. The provision of the compartmented tray incorporating the knife edges on the vertical separating walls provides a very convenient means for assuring precise sizing and for enabling accurate, efficient, and continuous operation of the apparatus inasmuch as all cores fed to the apparatus can be properly sized and when the glass jar receptacles are full, either the individual receptacles or the entire tray assembly can be removed and replaced with a corresponding empty one with very little interruption of the apparatus operation.

What is claimed is:

1. Apparatus for sizing articles comprising first and second cylindrical rollers having axes disposed in a common plane extending at an acute angle with respect to a horizontal reference plane; first mounting means rotatably supporting said first roller in a fixed position; second mounting means rotatably supporting said second roller, said second mounting means including means for selectively moving said second roller and for restricting movement of said second roller axis to said common plane; means for selectively locking said second roller in position; and means for rotating said rollers in opposite directions with said roller surfaces between said rollers moving away from one another immediately above said common plane; a base plate; said first mounting means including first and second blocks secured to said base plate supporting said first roller therebetween; third and fourth blocks fixed to said base plate; a first pair of parallel rods secured between said first and third blocks and a second pair of parallel rods secured between said second and fourth blocks; said second mounting means including fifth and sixth blocks respectively slidably supported on said first and second pairs of parallel rods and supporting said second roller therebetween.

2. The apparatus of claim 1 including first spring means mounted between said first and fifth blocks urging said fifth block away from said first block and second spring means mounted between said second and sixth blocks urging said sixth block away from said second block; and wherein said means for selectively moving said second roller includes first and second push rods supported for movement with respect to said third and fourth blocks and respectively engaged with said fifth and sixth blocks.

3. The apparatus of claim 1 wherein said means for locking said second roller in position includes a first pair of wedge blocks carried by said fifth block and a second pair of wedge blocks carried by said sixth blocks, said first pair of wedge blocks including first and second wedge blocks each respectively positioned adjacent a different one of said rods in said first pair of parallel rods, said second pairs of wedge blocks including third and fourth wedge blocks each respectively positioned adjacent a different one of said rods in said second pair of parallel rods; first lock control means for forcing said first pair of wedge blocks into engagement with said first pair of parallel rods; and second lock control means for forcing said second pair of wedge blocks into engagement with said second pair of parallel rods.

4. The apparatus of claim 1 including a tray having a plurality of compartments; and means for positioning said tray in a substantially horizontal plane beneath the space defined between said rollers and for vertically aligning each of said compartments with a unique portion of said defined space.

5. The apparatus of claim 4 wherein said compartments are separated by vertically extending walls, the upper portion of each of said walls terminating in a knife edge.

6. The apparatus of claim 4 wherein each of said compartments includes an inclined ramp having an upper end and a lower end, said upper ramp ends being positioned in substantially vertical alignment with said space defined between said rollers; and means removably supporting an open receptacle at said lower ramp end adapted to receive articles falling on said upper ramp end.

7. The apparatus of claim 1 including first and second wiper means respectively engaged with the surfaces of said first and second rollers above said common plane.

8. The apparatus of claim 7 wherein each of said wiper means includes a length of flexible tape; and means holding each of said tape lengths taut against the surface of a roller substantially parallel to the axis thereof.

References Cited by the Examiner

UNITED STATES PATENTS

| | | | |
|---|---|---|---|
| 2,062,946 | 12/1936 | Sorensen | 209—107 |
| 2,343,042 | 2/1944 | Barry | 209—107 |
| 2,422,036 | 6/1947 | Oakley | 209—107 |
| 2,960,224 | 11/1960 | Cronan | 209—107 |

FOREIGN PATENTS

| | | |
|---|---|---|
| 920,219 | 1/1947 | France. |

EVERETT W. KIRBY, *Primary Examiner.*